(12) United States Patent
Hall (10) Patent No.: US 7,359,216 B2
(45) Date of Patent: Apr. 15, 2008

(54) SMALL-FRAME COMPUTER WITH OVERLAPPING ADD-IN CARDS

(76) Inventor: Sean Phillip Hall, 3106 Yorba Linda Blvd., #B19, Fullerton, CA (US) 92831

( * ) Notice: Subject to any disclaimer, the term of this patent is extended or adjusted under 35 U.S.C. 154(b) by 0 days.

(21) Appl. No.: 11/400,576

(22) Filed: Apr. 7, 2006

(65) Prior Publication Data

US 2007/0236903 A1     Oct. 11, 2007

(51) Int. Cl.
*H05K 7/14* (2006.01)
*H05K 7/18* (2006.01)

(52) U.S. Cl. ............ 361/796; 361/752; 361/788; 361/683; 361/730

(58) Field of Classification Search ........ 361/735, 361/752, 788, 796, 728–730, 736, 679, 683; 439/61, 65; 29/830; 174/50, 521
See application file for complete search history.

(56) References Cited

U.S. PATENT DOCUMENTS

| | | | | |
|---|---|---|---|---|
| 4,901,205 A | * | 2/1990 | Landis et al. | 361/818 |
| 4,962,327 A | * | 10/1990 | Iwazaki | 326/106 |
| 4,971,563 A | * | 11/1990 | Wells, III | 439/61 |
| 4,979,075 A | * | 12/1990 | Murphy | 361/686 |
| 5,440,755 A | * | 8/1995 | Harwer et al. | 710/315 |
| 5,555,158 A | | 9/1996 | Dent | |
| 5,594,621 A | * | 1/1997 | van Rumpt | 361/686 |
| 5,707,242 A | * | 1/1998 | Mitra et al. | 439/74 |
| 5,831,821 A | * | 11/1998 | Scholder et al. | 361/686 |
| 5,911,049 A | * | 6/1999 | Watanabe | 710/100 |
| 5,943,215 A | * | 8/1999 | Carney et al. | 361/756 |
| 5,961,618 A | * | 10/1999 | Kim | 710/300 |
| 5,963,431 A | * | 10/1999 | Stancil | 361/803 |
| 6,034,870 A | | 3/2000 | Osborn | |
| 6,046,912 A | | 4/2000 | Leman | |
| 6,114,622 A | | 9/2000 | Draeger | |
| 6,246,588 B1 | * | 6/2001 | Kim et al. | 361/786 |
| 6,347,963 B1 | * | 2/2002 | Falkenberg et al. | 439/638 |
| 6,382,983 B2 | * | 5/2002 | Koyama et al. | 439/62 |
| 6,382,986 B1 | * | 5/2002 | Kim et al. | 439/74 |
| 6,504,729 B1 | * | 1/2003 | Collins et al. | 361/816 |
| 6,597,566 B1 | * | 7/2003 | Phan | 361/683 |
| 6,618,260 B2 | * | 9/2003 | Willis et al. | 361/752 |
| 6,731,515 B2 | | 5/2004 | Rhoads | |
| 6,830,458 B2 | * | 12/2004 | Kobayashi et al. | 439/59 |
| 6,976,848 B2 | * | 12/2005 | Choi | 439/61 |
| 7,009,848 B2 | * | 3/2006 | Ruckerbauer et al. | 361/785 |
| 7,045,891 B2 | * | 5/2006 | Choi | 257/723 |
| 7,123,470 B2 | * | 10/2006 | Hsu et al. | 361/679 |

* cited by examiner

*Primary Examiner*—Tuan T. Dinh
*Assistant Examiner*—Dameon E Levi (57) ABSTRACT

A computer module for electrically coupling a motherboard with add-in cards comprises risers connected to the motherboard and oriented facing toward each other, where the risers are connected to the add-in cards at different elevations above the motherboard, so that the add-in cards are parallel to the motherboard and overlap each other. The computer module includes a frame that can be rotated or adjusted to accommodate the need to connect with motherboard slots in various locations.

10 Claims, 7 Drawing Sheets

SMALL-FRAME COMPUTER WITH OVERLAPPING ADD-IN CARDS

FIELD OF THE INVENTION

This invention pertains to computers and more particularly a small-frame computer with overlapping add-in cards.

BACKGROUND OF THE INVENTION

Computers can be made small by using specialized, small components. However, specialized, small components cost more than standard, full-sized components and often do not have the performance capabilities of full-sized components. The cost of materials for a small-frame computer could be reduced by using full-sized components.

Motherboards, like those that follow the Advanced Technology Extended (ATX) standard, have slots which are connectors for add-in cards. Typical full-sized ATX motherboards have up to seven slots, as allowed by the ATX standard. Most of the slots might follow the Peripheral Component Interconnect (PCI) standard. One or more slots might be dedicated to high performance add-in cards for graphics processing, and might follow either the PCI-Express (PCI-E) standard, or the Accelerated Graphics Port (AGP) standard. The graphics add-in slot is typically either slot seven, which would be at one end of a group of slots, or slot six, which would be next to slot seven. In a typical computer, add-in cars are inserted into the motherboard slots so that the add-in cards stick up perpendicular to the motherboard. Since an ATX motherboard is typically 9 by 12 inches and full-sized add-in cards are typically 5 inches wide, the typical approach takes up 540 cubic inches for add-in cards. A small-frame computer would not have enough room for full-sized add-in cards that stand perpendicular to the motherboard.

SUMMARY OF THE INVENTION

By using only a few add-in cards parallel to the motherboard, the volume required for the motherboard and add-in cards could be reduced in a small-frame computer, while still using standard, full-sized components such as an ATX motherboard with PCI, PCI-E or AGP add-in cards. For example, if the add-in cards were at most 2 inches from the motherboard, then the total volume would be 216 cubic inches for add-in cards, in contrast with the 540 cubic inches required in the prior art.

It is therefore an object of the invention to provide a small-frame computer that uses standard, full-sized components.

In accordance with one aspect of the invention, a computer module is provided for electrically coupling a motherboard with add-in cards which has risers connected to the motherboard and oriented facing toward each other, where the risers are connected to the add-in cards at different elevations above the motherboard, so that the add-in cards are parallel to the motherboard and overlap each other.

In accordance with another aspect of the invention, a computer module is provided with a frame that can be rotated, or adjusted to accommodate the need to connect with motherboard slots in various locations.

BRIEF DESCRIPTION OF THE DRAWINGS

The invention is generally shown by way of reference to the accompanying drawings in which.

DETAILED DESCRIPTION OF THE INVENTION

The preferred embodiment and additional embodiments are described in detail with reference to the related drawings. Further embodiments, features and advantages will become apparent from the ensuing description or may be learned by practicing the invention. In the figures, which are not drawn to scale, like reference numerals refer to like features throughout the description. The following description of embodiments is not to be taken in a limiting sense, but is made merely for the purposes of describing the general principles of the invention.

Figure 1:
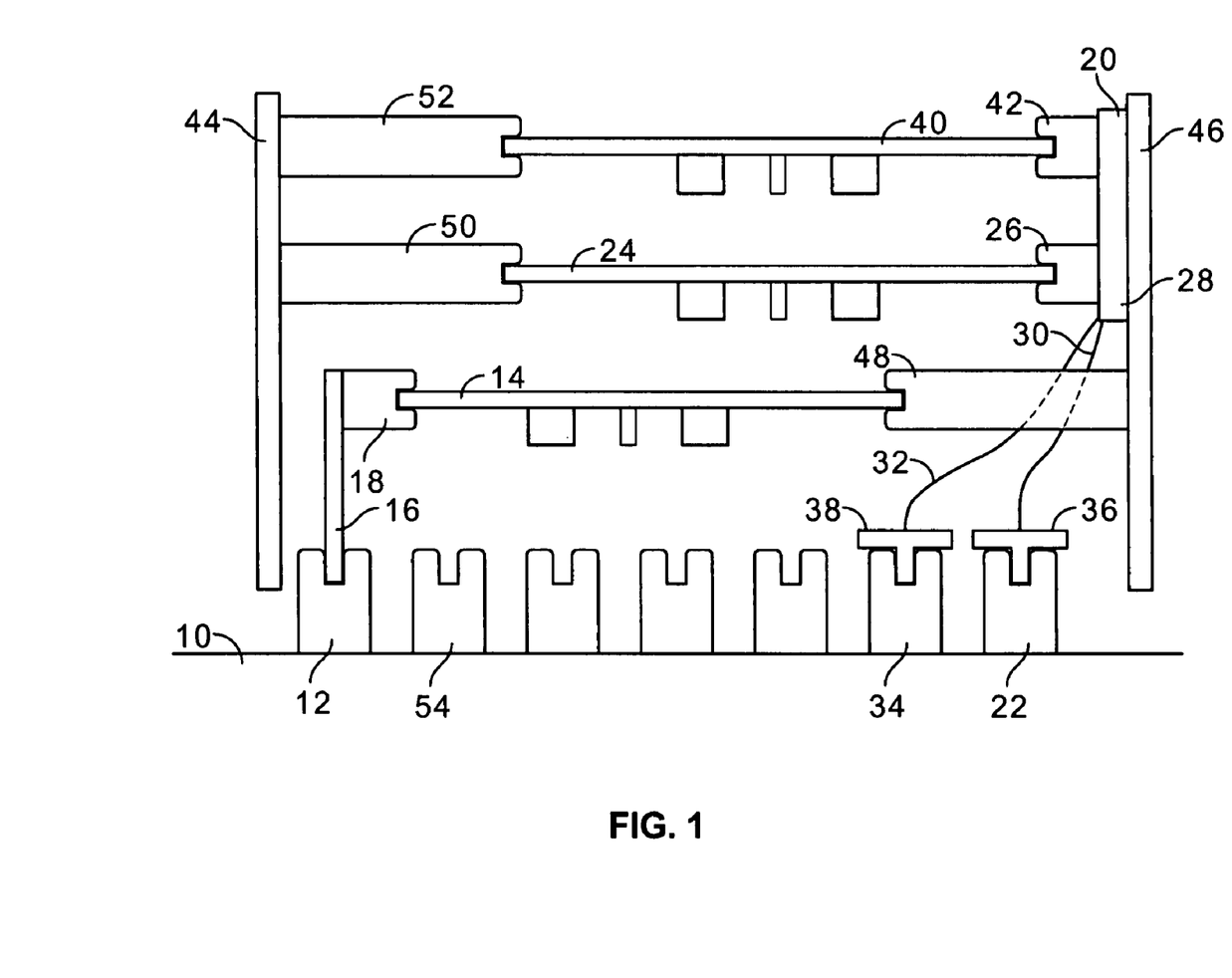
FIG. 1 depicts an embodiment of a computer module for electrically coupling a motherboard with add-in cards.

FIG. 1 depicts an embodiment of a computer module for electrically coupling a motherboard with add-in cards. In one embodiment of the invention, motherboard 10 has seven add-in card connectors, also called slots, numbered from one to seven. Slots one through six might be PCI connectors, or x4, x2 or more commonly x1 (pronounced "by-one") PCI-E slots and slot seven might be a high performance AGP or x16 PCI-E connector intended for a video card or other higher bandwidth peripheral. High performance slot seven is depicted in FIG. 1 as first motherboard connector 12. First add-in card 14 is a high performance video card that, in the prior art, would have directly connected into first motherboard connector 12.

In the embodiment of FIG. 1, first riser 16 is electrically coupled with motherboard 10 through first motherboard connector 12, and first riser 16 is also electrically coupled with first add-in card 14 through first riser connector 18, so that instead of standing perpendicular to motherboard 10, first add-in card 14 lays substantially parallel to motherboard 10.

A riser is an extender for slots on a motherboard. Risers are generally passive devices that transmit electronic signals over tracings or through wires. The riser is electrically coupled with the motherboard and add-in cards in that it carries at least some of the electronic signals that would otherwise be transmitted directly between the motherboard and the add-in card. It is not always necessary for the riser to carry all the electronic signals, but one embodiment uses commercially available PCI or AGP components that transmit all signals, which leaves flexibility in accommodating different kinds of add-in cards.

To accommodate PCI slots, a riser would generally have a rigid printed circuit board, a flexible ribbon cable or other insulated conductor, or a combination of both. One end of the riser would have an edge connector for inserting into PCI slots on the motherboard. The rest of the riser would have one or more PCI connectors similar to the motherboard slots, pointing at a right angle to the edge connector. Instead of inserting the add-in card directly into the motherboard connector, the add-in card is inserted into the riser and the riser is inserted into the motherboard connector. The add-in card is substantially parallel to the motherboard in that it is turned sufficiently to the side so as to avoid the need for space found in the prior art, where the add-in card stands perpendicular to the motherboard. Risers could be for PCI, PCI-E, AGP or other types of slots. A riser will have connectors on the solder side or A side, or have connectors on the component side or B side. Examples of commercially available AGP risers that hold the add-in card substantially parallel to the motherboard are the AGPTX4-6B and AGPTX4-7B.

In the embodiment of FIG. 1, second riser 20 is electrically coupled with motherboard 10 through second motherboard connector 22, and second riser 20 is also electrically coupled with second add-in card 24 through second riser connector 26, so that second add-in card 24 lays substantially parallel to motherboard 10.

The risers are oriented facing toward each other, rather than away from each other or in the same direction, in that first riser connector 18 is positioned on first riser 16 so that first add-in card 14 will extend in the general direction of second riser 20, and second riser connector 26 is positioned on second riser 20 so that second add-in card 24 will extend in the general direction of first riser 16. It is not necessary for the risers to be aligned with or parallel to each other, so long as the add-in cards generally occupy space between the risers.

First riser 16 is located at a sufficient distance from second riser 20 so that the add-in cards will have room to fit between them. In one embodiment, the distance between the risers is at least equal to the height of the longest add-in card. A sufficient distance is required, which means that if the risers are too close together, the add-in cards will not fit. If the computer module extends to cover all the motherboard slots, or even most of the slots such as ATX slots one through six or two through seven, that would be space enough for full-sized PCI cards. If cards that are smaller than full-sized cards are used, even less distance would be required.

In the embodiment of FIG. 1, riser 16 is a rigid printed circuit board which could provide some support to first add-in card 14 when connected to first motherboard connector 12, by holding the add-in card up above the motherboard against the force of gravity and impacts. Riser 20 has a printed circuit board portion 28 which holds second riser connector 26, and two flexible portions, a PCI ribbon cable 30 which electrically couples with connector 22, and a smaller signal cable 32 which optionally electrically couples with part of connector 34, if necessary. The cables 30, 32 are terminated with edge connectors 36, 38 that can electrically couple with the motherboard slots. Riser 20, not being rigidly connected to the motherboard, can provide support to second add-in card 24 when riser 20 is supported by a frame. In other embodiments, riser 20 is a printed circuit board like riser 16, and can provide support to add-in cards when it is connected to second motherboard connector 22, or both risers 16 and 20 could use cables or other flexible connections to ease in installation.

In the embodiment of FIG. 1, second riser 20 is also electrically coupled with third add-in card 40 through third riser connector 42, so that third add-in card 40 lays substantially parallel to motherboard 10.

Second riser 20 can accommodate both riser connectors 26, 42 by electrically coupling them in parallel to a single PCI bus. Both second add-in card 24 and third add-in card 40 will share the tracings on printed circuit board portion 28 and the wires in PCI ribbon cable 30 to electrically couple with second motherboard connector 22. Since first add-in card 14 is the only device that uses first motherboard connector 12, first add-in card 14 may fully exploit the bandwidth provided by the high performance AGP/PCI-E x16 or x32 slot seven. Second and third add-in cards 24, 40 share connector 22, and might run at different speeds than first add-in card 14.

The elevations of add-in cards 14, 24, 40 above motherboard 10 must be sufficiently different from each other so that the add-in cards will have room to fit. For example, assuming third add-in card 40 on second riser 20 is facing down, there must be room for add-in card 40 to fit above add-in card 24, and it would also be desirable for some airspace between add-in cards 24, 40 for cooling.

The add-in cards overlap each other over the motherboard in that, because the risers face toward each other, assuming there is enough room, part of add-in card 14 is above or below add-in card 24 at a point which is over motherboard 10. In FIG. 1, first riser 16 faces to the right and second riser 20 faces to the left so that the risers face each other. Since there is also sufficient horizontal distance between the risers and sufficient vertical distance between connectors 18, 26, 42 for the add-in cards to fit, all three add-in cards 14, 24, 40 overlap each other over motherboard 10.

The embodiment of FIG. 1 also includes a frame to which the risers can be removably attached. First frame side 44 and second frame side 46 are connected to at least a third frame side (not shown in FIG. 1) and possibly also fourth or more sides. The first and second frame sides 44, 46 are generally opposite each other, in that they face each other from across the frame. When the frame is a rectangle, the opposing sides would be non-adjacent sides of the rectangle. The third frame side keeps frame sides 44 and 46 at the proper distance and orientation from each other. The frame sides are connected to each other mechanically, possibly using screws or bolts, and are not, in general, electrically connected.

In one embodiment, second riser 20 is supported by second frame side 46, thereby allowing second and third riser connectors 26, 42 to support add-in cards 24, 40. First riser 16 would provide at least some support through first riser connector 18 to add-in card 14 since it is a rigid printed circuit board directly attached to first motherboard connector 12. First riser 16 could also be attached to first frame side 44, to provide even further support to add-in card 14 and to form a single module that includes a frame and users.

In other embodiments, the third frame side could be made of interlocking plates that allow the third frame side to be adjusted in length. By changing the length of the third frame side, first frame side 44 can be repositioned closer to slot six, so that first riser 16 can electrically couple with motherboard 10 through motherboard connector 54. This allows the computer module to transition between two or more configurations for accessing different motherboard slots by adjusting the size of the frame.

The computer module will generally be of sufficient length and width to extend just beyond of the motherboard slots. In one embodiment using an ATX motherboard with seven PCI slots, first frame side 44 is just outside slot seven and second frame side 46 is just outside slot one, so that the frame completely covers all the slots. The frame is not much bigger than it needs to be to surround the portion of the motherboard with add-in slots, and hold the add-in cards above and parallel to the motherboard. The frame height is no more than is needed to accommodate the add-in cards, which in one embodiment is 2 inches from the motherboard to the top of the frame.

The embodiment of FIG. 1 also includes first, second, and third support mechanisms 48, 50, 52 for supporting the add-in cards above the motherboard. A support mechanism is a holding clamp or retainer that can be loosened and pushed out of the way to add or remove an add-in card, and can be extended and tightened to hold an add-in card in place. The support mechanisms help prevent the add-in cards from coming loose due to impact or other jarring forces.

First support mechanism 48 is attached to second frame side 46 at approximately the same height above motherboard 10 as first riser connector 18, so that add-in card 14 will be held above and generally parallel to motherboard 10. Similarly, second and third support mechanisms 50, 52 are attached to first frame side 44 at the same heights as connectors 26, 42, respectively, so that all add-in cards 14, 24, 40 will be held generally parallel to each other and to motherboard 10.

Figure 2:
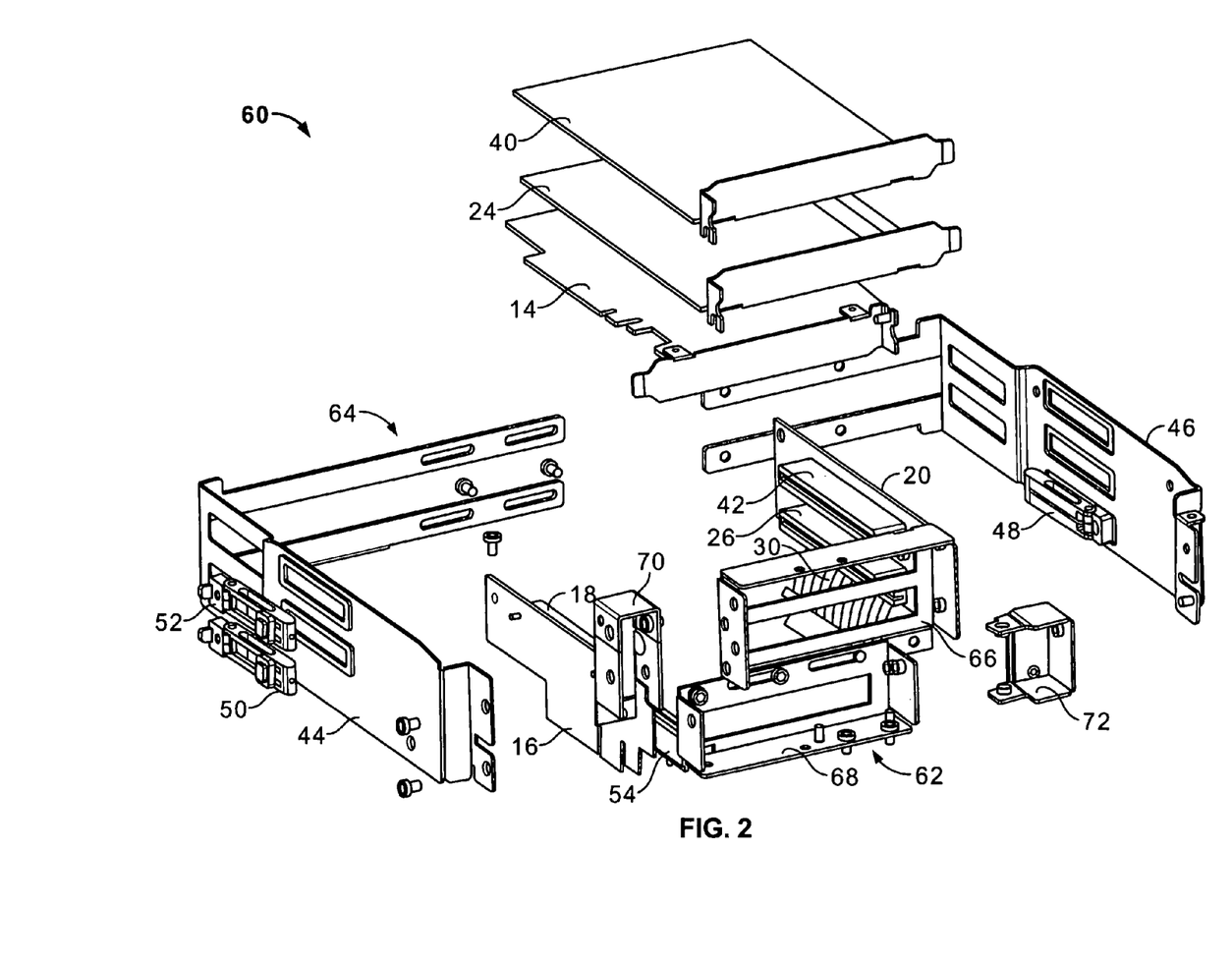
FIG. 2 depicts an embodiment of a computer module, with components shown in exploded view.

FIG. 2 depicts an embodiment of a computer module, with components shown in exploded view. Computer module 60 includes the components described in FIG. 1, plus third frame side 62 and fourth frame side 64. Third frame side 62 connects to and holds first frame side 44 and second frame side 46 near the front of computer module 60 as depicted in FIG. 2, and fourth frame side 64 connects to and holds frame sides 44, 46 near the back.

Third frame side 62 consists of double-sized cage 66, single-sized cage 68, large spacer 70 and small spacer 72. Double-sized cage 66 and single-sized cage 68 are slidably connected to each other, so that the length of third frame side 62 can be adjusted. Double-sized cage 66 could attach to and help support second and third add-in cards 24, 40, while single-sized cage 68 could attach to and help support first add-in card 14. Spacers 70, 72 could combine with cages 66, 68 and frame sides 44, 46 to hold and support risers 16, 20 and add-in cards 14, 24, 40 within computer module 60.

Fourth frame side 64 consists of two plates or bars which are the back portions of first frame side 44 and second frame side 46. These plates are also slidably connected to each other so that the length of fourth frame side 64 can be adjusted. By sliding the cages of third frame side 62 and the plates of fourth frame side 64, the length of third frame side 62 and fourth frame side 64 can be adjusted so as to maintain the orientation yet change the distance between first frame side 44 and second frame side 46.

In FIG. 2, the plates that make fourth frame side 64 and the cages that make third frame side 62 are slidably connected in that they are attached with two oblong holes and a screw. The screw can be loosened, the plates or cages pulled apart or pushed together so as to modify the length of the side, and the screw can be re-tightened.

Figure 3:
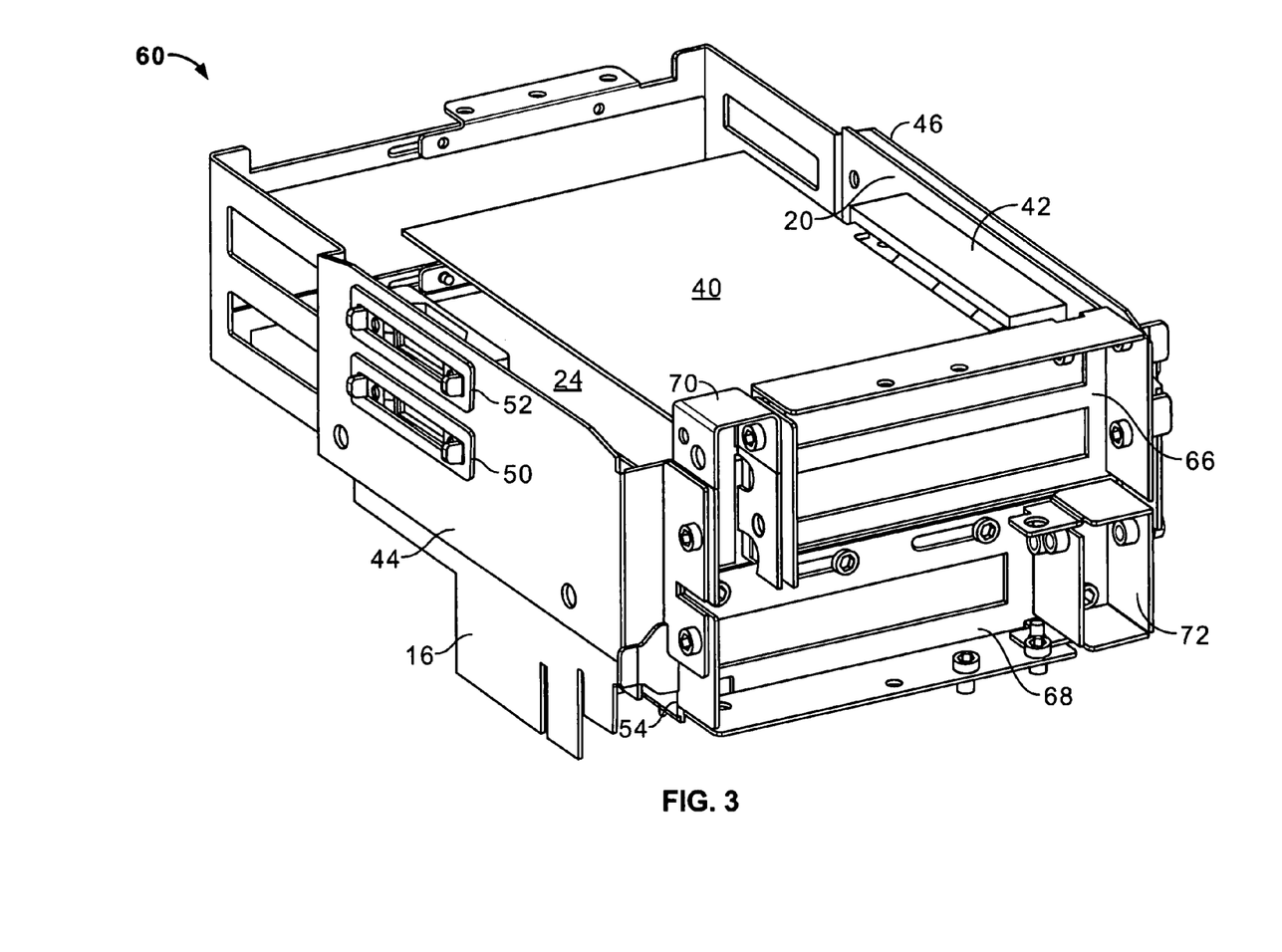
FIG. 3 depicts an embodiment of a computer module, with components assembled.

FIG. 3 depicts an embodiment of a computer module, with components assembled. This is the same embodiment as shown in FIG. 2, but with components assembled.

Figure 4:
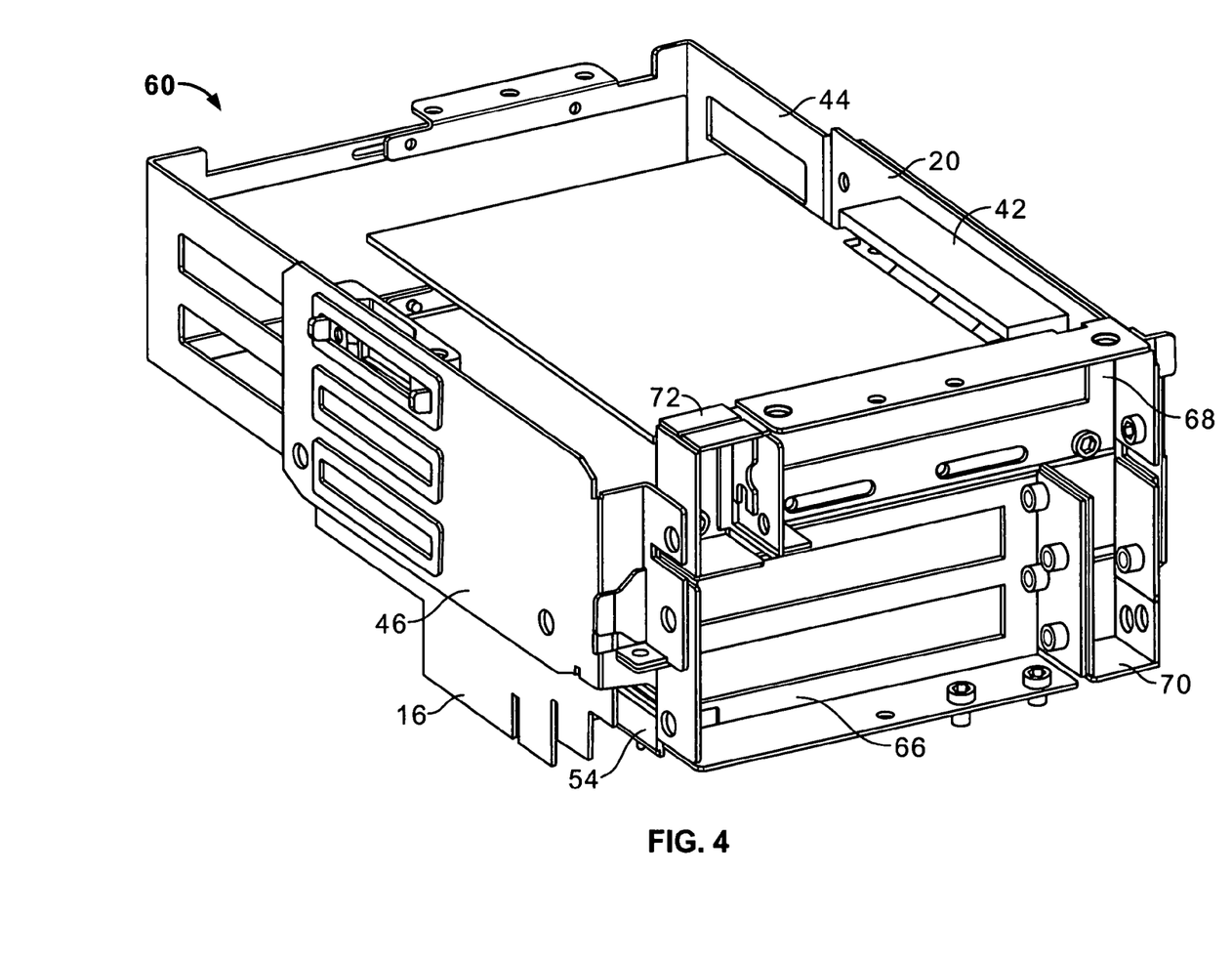
FIG. 4 depicts an embodiment of a computer module, which has been rotated from top to bottom.

FIG. 4 depicts an embodiment of a computer module, which has been rotated from top to bottom. The computer module has been turned upside down within the plane of the drawing, like rotating a piece of paper on your desk. Double-sized cage 66 is now on the bottom, single-sized cage 68 is now on top, and spacers 70, 72 have been switched. First frame side 44 is now on the right, and second frame side 46 is now on the left. First riser 16 has been repositioned and connected to second frame side 46 so that will it still be near slot seven (first motherboard connector 12) on the left. Similarly, second riser 20 has been repositioned and connected to first frame side 44 so that it will still be near slot one (second motherboard connector 22) on the right.

In one embodiment, first riser 16 connects to a double-height AGP video card, so that double-sized cage 66 holds a single, double-height add-in card. The ability for the frame to rotate allows double-sized AGP cards to use the same frame as the frame depicted in FIG. 3. In one embodiment, first riser 16 and second riser 20 are disconnected, the frame is rotated, and the risers are reconnected and re-used. In other embodiments, one or more of the risers is replaced with a different riser, such as a riser having a riser connector at a different elevation.

Figure 5:
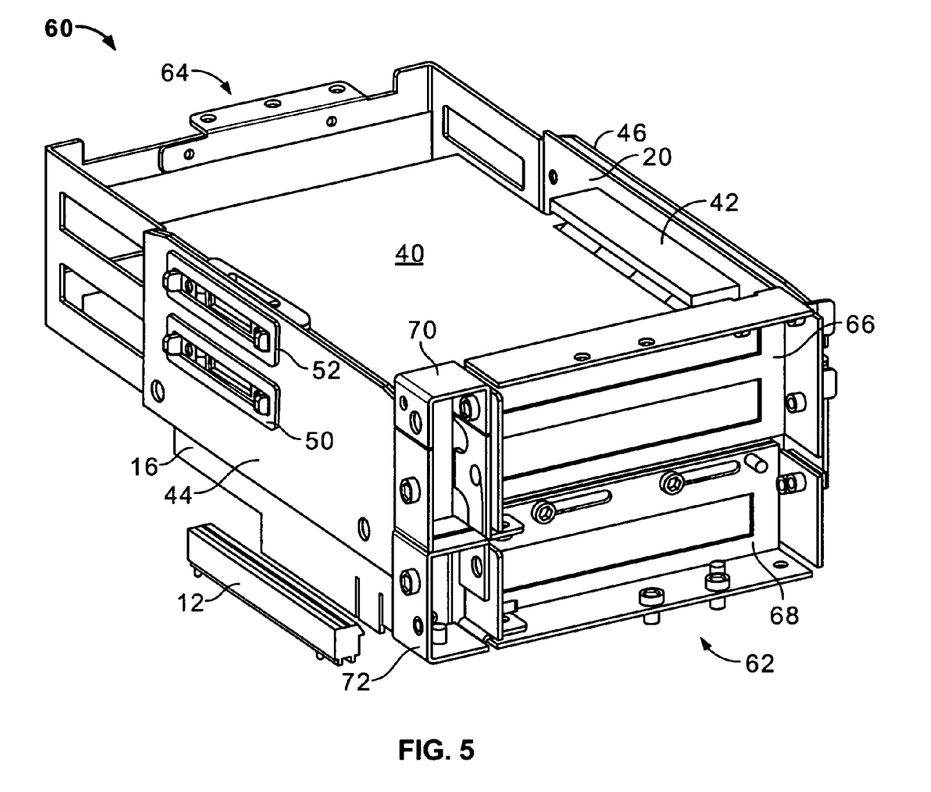
FIG. 5 depicts an embodiment of a computer module, which has been adjusted to use a different add-in card connector on the motherboard.

FIG. 5 depicts an embodiment of a computer module, which has been adjusted to use a different add-in card connector on the motherboard. This is similar to the embodiment of FIG.3, except that third side 62 and fourth side 64 are adjusted in length, and left frame side 44, single-sized cage 68 and small spacer 72 have been repositioned. Instead of connecting first riser 16 with first motherboard connector 12, first riser 16 is in a position to connect with motherboard connector 54. This allows for the use of add-in boards such as AGP video cards that must be connected with slots five or six instead of slot seven.

Figure 6:
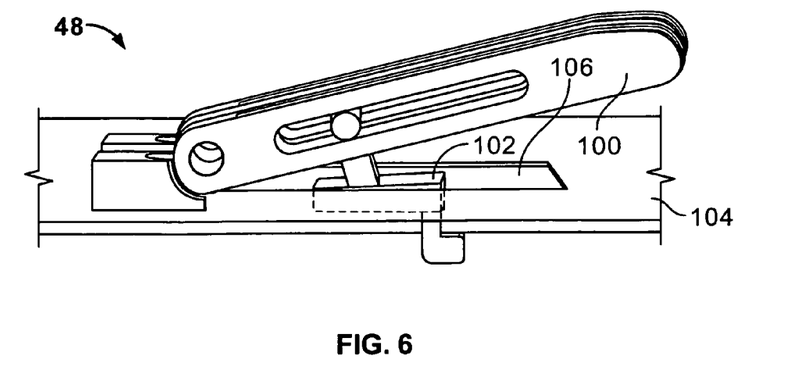
FIG. 6 depicts an embodiment of a support mechanism to retain add-in cards.

FIG. 6 depicts an embodiment of a support mechanism to retain add-in cards. In one embodiment, support mechanism 48 includes arm 100, slider 102, and base 104. Arm 100 extends to hold an add-in card (not shown) by the card's edge. Slider 102 is moved along base 104 through groove 106. Depending on the position of slider 102, arm 100 will be forced to extend out away from base 104. Slider 102 can be loosened to allow arm 100 to move in and out, and slider 102 can be tightened against base 104 so that arm 100 will stay in position.

Figure 7:
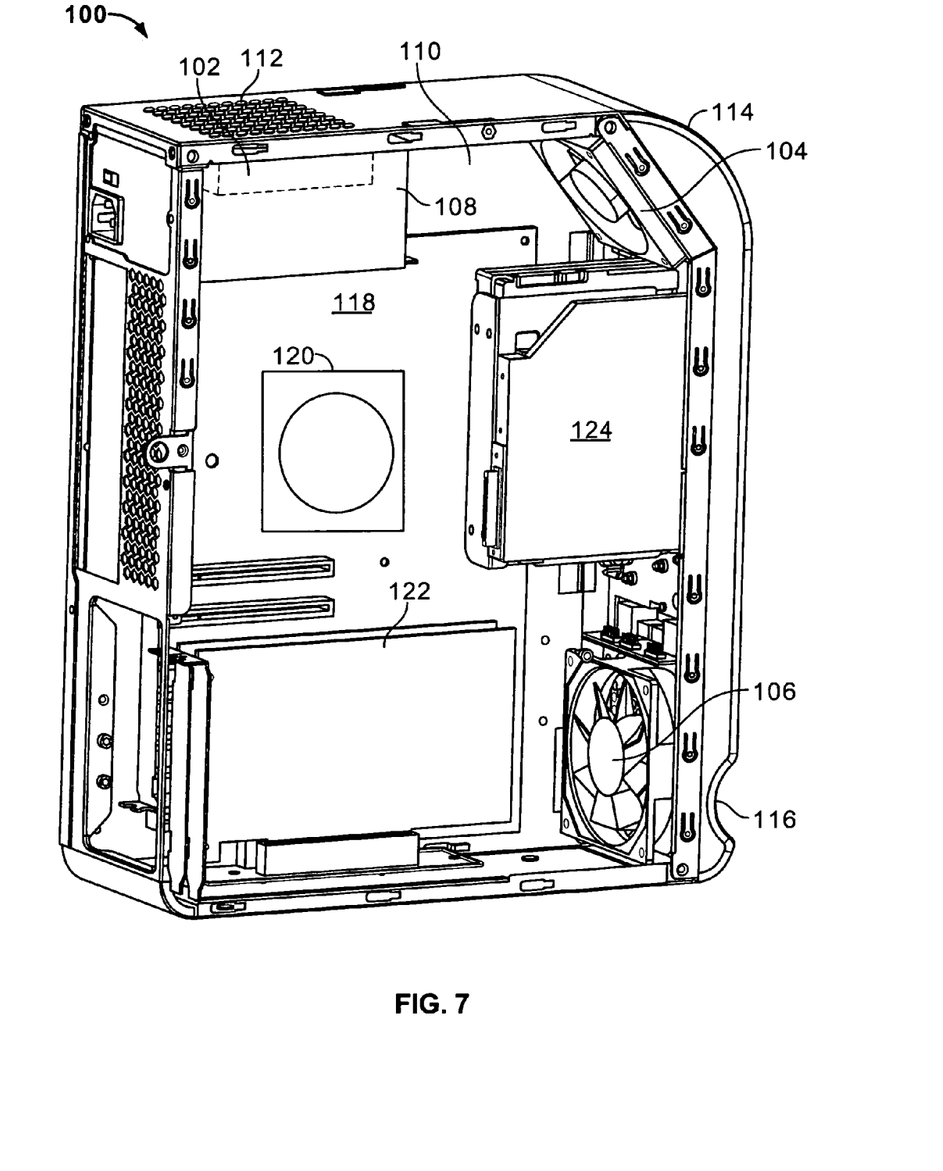
FIG. 7 depicts an embodiment of a computer chassis, viewed from the side.

FIG. 7 depicts an embodiment of a computer chassis, viewed from the side. In one embodiment, computer chassis 100 has two chambers 108, 110, three fans 102, 104, 106 and three air sources 112, 114, 116. Power supply chamber 108 contains a power supply (not shown) and holds fan 102 near the top of computer chassis 100 in a position so that fan 102 can draw air from air source 112 and cool the power supply.

Main chamber 110 contains motherboard 118, computer module 122, peripheral devices 124, and fans 104, 106. Motherboard 118 contains CPU 120 and has slots for add-in cards. Computer module 122 could be the computer module of FIG. 1 electrically coupled with the slots of motherboard 118, or another arrangement of one or more add-in cards substantially held parallel to motherboard 118. Main chamber 110 holds fan 104 in an elevated, angled-down position so that fan 104 can draw air from air source 114 to cool CPU 120, computer module 122 and peripherals 124. Main chamber 110 holds fan 106 in a low, horizontal position so that fan 106 can draw air from air source 116 to cool computer module 122.

Figure 8:
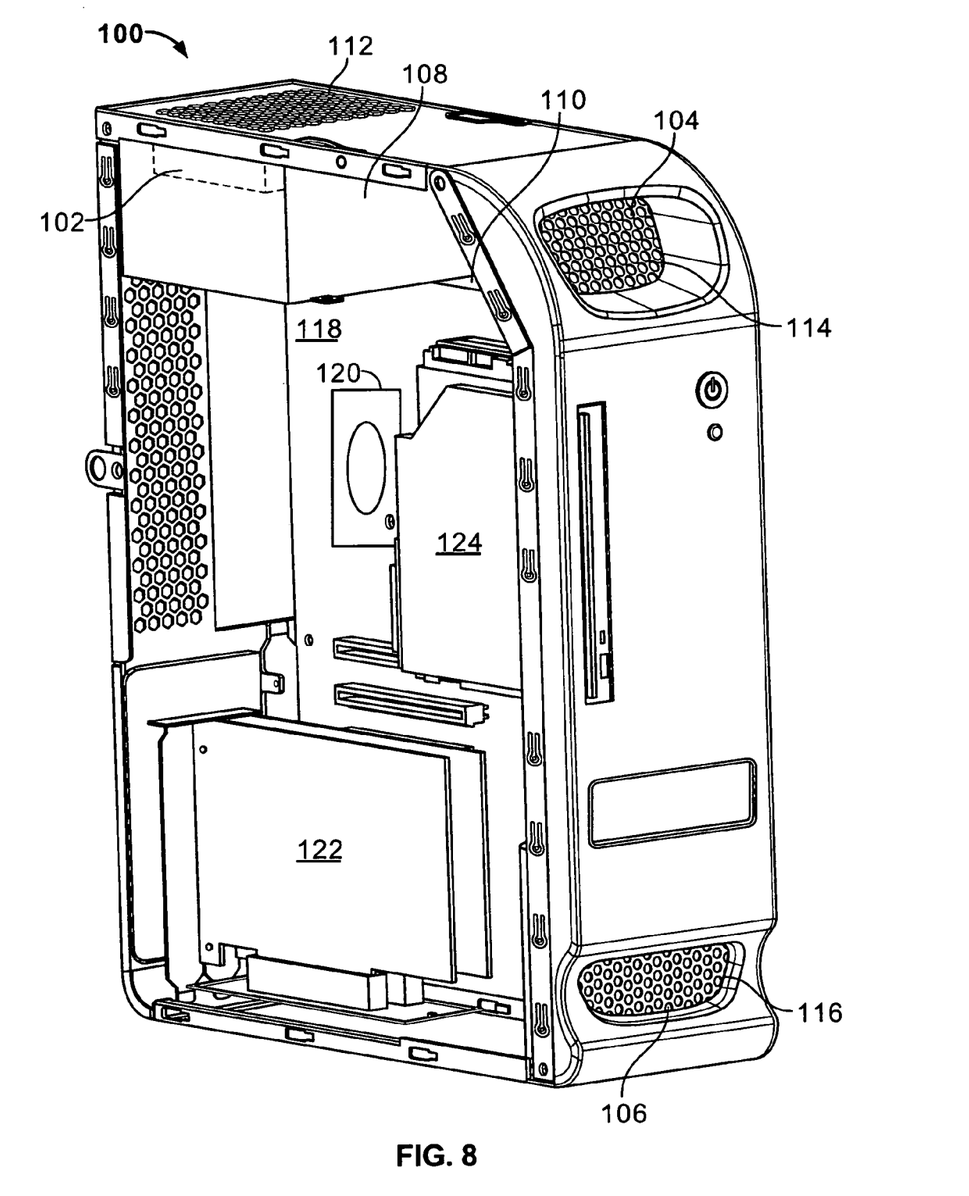
FIG. 8 depicts an embodiment of a computer chassis, viewed from the front.

FIG. 8 depicts an embodiment of a computer chassis, viewed from the front. This is the same computer chassis 100 depicted in FIG. 7. Air sources 114, 116 are formed from apertures in the body of computer chassis 100, covered with screens, and shaped to visually highlight the location of the air sources and to give an aerodynamic impression to computer chassis 100.

What is claimed is:

1. A computer module for electrically coupling a motherboard with at least first and second add-in cards, the computer module comprising:

a first riser electrically coupled with the motherboard and electrically coupled with the first add-in card at a first card elevation above the motherboard;

a second riser electrically coupled with the motherboard, and electrically coupled with the second add-in card at a second card elevation above the motherboard;

the first and second risers oriented facing toward each other, the first and second risers being sufficiently distant from each other, and the first and second card elevations above the motherboard being sufficiently different from each other, so that the add-in cards will extend from the risers generally parallel to the motherboard, and will at least partly overlap each other over the motherboard; and a frame having at least first, second, and third frame sides, the second frame side generally opposite the first frame side, the third frame side connecting to and holding the first and second frame sides;

wherein the first riser is connected to and held by the first frame side, and the second riser is connected to and held by the second frame side.

2. A computer module assembly comprising:
a motherboard;
an add-in card; and
the computer module of claim 1;
wherein the computer module electrically couples the add-in card to the motherboard.

3. The computer module of claim 1, wherein the distance between the first riser and the second riser is at least equal to the height of the longest add-in card, thereby allowing room for the add-in cards to fit between the risers.

4. The computer module of claim 1, wherein the difference between the first and second card elevations above the motherboard is at least equal to the height of an add-in card, thereby allowing for room between the add-in cards.

5. The computer module of claim 1, the motherboard having at least first and second motherboard connectors, wherein:

the frame is adjustable between a first configuration and a second configuration; in the first configuration, the first frame side is positioned near the first motherboard connector, so that the first riser can electrically couple with the motherboard through the first motherboard connector; in the second configuration, the first frame side is positioned near the second motherboard connector, so that the first riser can electrically couple with the motherboard through the second motherboard connector; and the length of the third frame side is adjustable so that first frame side can be moved relative to the second frame side, thereby allowing the frame to transition between the first configuration and the second configuration.

6. The computer module of claim 1, further comprising:
a support mechanism connected to the second frame side, the support mechanism adapted to releasably hold the first add-in card.

7. The computer module of claim 1, wherein: the second riser is further adapted to electrically couple with a third add-in card at a third card elevation above the motherboard, the third card elevation above the motherboard being sufficiently different from the first and second card elevations above the motherboard so that the third add-in card will extend from the second riser generally parallel to the motherboard and at least partly overlap with the first add-in card over the motherboard.

8. The computer module of claim 1, wherein the frame can be rotated from top to bottom so that the first riser can be repositioned and connected to the second frame side, and the second riser can be repositioned and connected to the first frame side.

9. A computer module for electrically coupling a motherboard with an add-in card, the motherboard having at least first and second motherboard connectors, the computer module comprising:

a frame which is adjustable to transition between a first configuration and a second configuration; a riser electrically coupled with the motherboard, and electrically coupled with the add-in card, the riser connected to and held by the frame and oriented so that the add-in card will extend from the riser generally parallel to the motherboard;

wherein, in the first configuration, the riser is held by the frame so as to be positioned near the first motherboard connector, so that the riser is electrically coupled with the motherboard through the first motherboard connector; and in the second configuration, the riser is held by the frame so as to be positioned near the second motherboard connector, so that the riser is electrically coupled with the motherboard through the second motherboard connector.

10. A method for electrically coupling a motherboard with at least first and second add-in cards, the method comprising:

providing a first riser;

electrically coupling the first riser with the motherboard, electrically coupling the first riser with the first add-in card at a first card elevation above the motherboard;

providing a second riser; electrically coupling the second riser with the motherboard, electrically coupling the second riser with the second add-in card at a second card elevation above the motherboard;

orienting the first and second risers facing toward each other, positioning the first and second risers sufficiently distant from each other on the motherboard, and elevating the first and second cards above the motherboard so that the card elevations are sufficiently different from each other, so that the add-in cards will extend from the risers generally parallel to the motherboard, and will at least partly overlap each other over the motherboard;

providing a frame having at least first, second, and third frame sides, the second frame side generally opposite the first frame side, the third frame side connecting to and holding the first and second frame sides, the frame adjustable between a first configuration and a second configuration by changing the length of the third frame side so that, in the first configuration, the first frame side is positioned near the first motherboard connector so that the first riser can electrically couple with the motherboard through the first motherboard connector, and in the second configuration, first frame side is positioned near the second motherboard connector so that the first riser can electrically couple with the motherboard through the second motherboard connector; connecting the first riser to the first frame side;

connecting the second riser to the second frame side; and adjusting the length of the third frame side to transition the frame into one of the first configuration or the second configuration.

* * * * *